United States Patent [19]

Builta

[11] 4,095,763
[45] Jun. 20, 1978

[54] FAIL SAFE AUGMENTATION SYSTEM

[75] Inventor: Kenneth E. Builta, Euless, Tex.

[73] Assignee: Textron, Inc., Providence, R.I.

[21] Appl. No.: 771,898

[22] Filed: Feb. 25, 1977

[51] Int. Cl.² ............................................. G05D 1/00
[52] U.S. Cl. ............................... 244/194; 91/363 A;
318/564; 318/565
[58] Field of Search .................. 244/78, 83 G, 194;
318/563, 564, 565, 566; 91/363 A

[56] References Cited
U.S. PATENT DOCUMENTS

| | | | |
|---|---|---|---|
| 3,462,660 | 8/1969 | Barltrop | 318/564 |
| 3,514,056 | 5/1970 | DiCamillo | 244/78 |
| 3,733,039 | 5/1973 | O'Connor | 244/194 |

Primary Examiner—Trygve M. Blix
Assistant Examiner—Reinhard J. Eisenzopf
Attorney, Agent, or Firm—Richards, Harris & Medlock

[57] ABSTRACT

A fail safe aircraft control system wherein duplicate control loops are employed to produce identical control signals for the system actuator. Output signals from the two loops are compared to detect when the outputs differ by a preset limit as an indication of a component failure. When such a failure is detected the system actuator is deactivated thus preventing the failed augmentation system from affecting control of the aircraft.

11 Claims, 6 Drawing Figures

FAIL SAFE AUGMENTATION SYSTEM

FIELD OF THE INVENTION

This invention relates to aircraft control systems augmented for added stability and control or for pilot force feel and more particularly for such a system with fail safe operation.

THE PRIOR ART

Existing systems are available to augment the control of an aircraft to improve stability and control. Systems are also available to provide force feedback to the pilot in hydraulically powered and fly-by wire systems. Actuators employed in both such systems are capable of providing high power outputs and the amplifiers used often have high gain; thus when an erroneous signal is introduced, such as when a component fails within the system, the actuator may be driven hard over thereby applying sudden and erratic forces into the aircraft controls. Such forces result in difficulty in controlling the aircraft or even cause a complete loss of control.

The present invention is directed toward detecting a failure within an augmentation or force feel system and then automatically deactivating that system. Prompt failure detection will minimize the introduction of erratic forces into the aircraft control system and will allow the pilot to continue operating the aircraft in a manual mode.

SUMMARY OF THE INVENTION

In accordance with this invention there is provided a fail safe augmented control or force feel system for an aircraft in which a pilot positions the control surfaces with a control stick. The system comprises an acutator, mechanical linkage between the control stick and actuator, and two identical drive circuits for the actuator. Means are provided to compare the outputs of the two drive circuits and generate a difference signal. Further means are provided for determining if the difference signal exceeds a predetermined level and if such level is exceeded for deactivating the actuator. Such deactivation of the actuator leaves the aircraft under the manual control of the pilot through the control stick.

DESCRIPTION OF THE DRAWINGS

The novel features believed characteristic of the invention are set forth in the appended claims. The invention, itself, however, as well as further objects and advantages thereof, will best be understood by reference to the following detailed description of an illustrative embodiment taken in conjunction with the accompanying drawings, in which:

DESCRIPTION OF THE PREFERRED EMBODIMENTS

Figure 1:
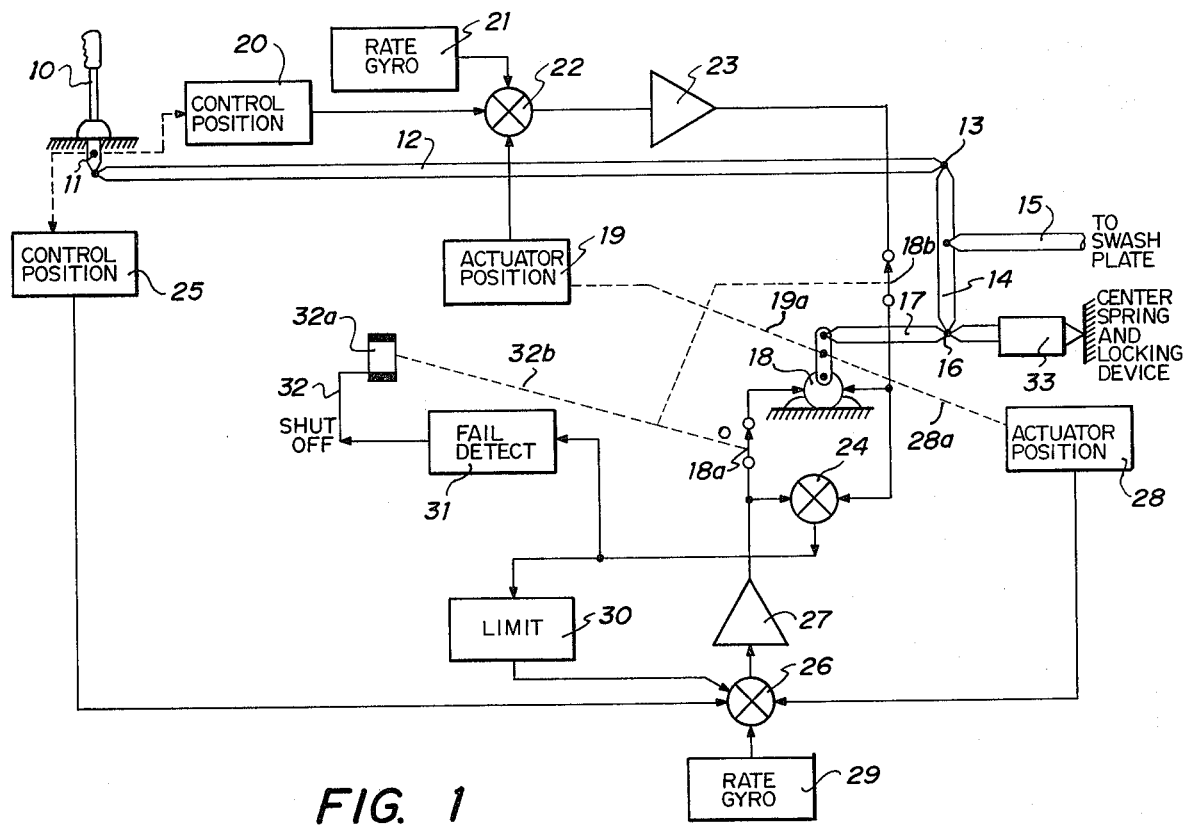
FIG. 1 is a block diagram of a fail safe stability and control augmentation system in accordance with the present invention.

The fail safe aircraft control augmentation system of FIG. 1 includes a control stick 10 pivoted at 11 and coupled to linkage 12 which, in turn, is coupled through pivot 13 to a mixing link 14. The output link 15 of the mixing link 14 leads to a swashplate (not shown) to apply any command movement of stick 10 to the swashplate. The mixing link 14 is connected at pivot 16 to linkage 17 leading from actuator 18 which is linked to an actuator position sensor 19.

The control stick 10 is also connected to a control position sensor 20 having an output applied to a summing unit 22. Also connected to the summing unit 22 is the output of a rate gyro 21 and the output of a position sensor 19. The position sensor 19 is coupled by means of linkage 19a to the crank arm of the actuator 18. The sum of the various inputs to the summing unit 22 is provided as the input to amplifier 23 which then drives one terminal of the actuator 18 and also applies its summed signal to one terminal of a summing unit 24.

In operation when, a pilot injects a command by movement of stick 10, an error signal appears at the input of amplifier 23. This error signal is applied to energize actuator 18 causing new outputs of the position sensor 19 and the rate gyro 21 to be applied to the summing unit 22. As the system operates in response to the new pilot command it will cause the error signal applied to the amplifier 23 to go to zero at which point the commanded position has been achieved.

A second identical but independent system is provided leading to the second input of the acutator 18. More particularly, a second control position sensor 25 is connected to the control stick 10 and provides an input to a summing unit 26. Also providing inputs to the summing unit 26 is a rate gyro 29, a limiter 30, and a position sensor 28. The position sensor 28 is coupled by means of a linkage 28a to the crank arm of the actuator 18.

An error signal at the output of the summing unit 26 is applied to an amplifier 27 which is connected to the actuator 18 and to the summing unit 24. The signals provided by the sensors 20 and 25 are 180 degrees out of phase so that the signals at the input terminals to actuator 18 are of opposite phase and thus drive the actuator 18.

The output of the summing unit 24 represents the difference between the two output voltages from the amplifiers 23 and 27. If any difference exists, a difference signal is applied by way of the limiter 30 as a fourth input to the summing unit 26. The difference signal is also applied to a failure detector 31 the output of which is applied by way of channel 32 to terminate driving power to the actuator 18. For purposes of illustration, channel 32 is shown as including a solenoid 32a coupled by linkage 32b to switchs 18a and 18b. Switch 18a is in the circuit leading from amplifier 27 to actuator 18 and switch 18b is in the circuit between amplifier 23 and actuator 18. With switchs 18a and 18b open the error signals from the amplifiers 23 and 27 cannot be applied to actuator 18.

Failure detector 31 is constructed so that the shut off signal on line 32 will appear only when the output of summing unit 24 exceeds a predetermined threshold level. When the error signals are cut off from actuator 18, a centering spring and locking unit 33 returns the pivot point 16 to a center or reference position and leaves the control of the aircraft solely under the manual operation of a pilot through the stick 10.

In the above description, the centering spring and locking device 33 operates when the actuator is shut off to return the linkage to a center position and to lock it. It is recognized that a centering operation by unit 33 will introduce a command signal into the system specifically inasmuch as it will change the position of linkage 15. In a preferred mode of operation, the actuator 18 is constructed so that upon removal of power therefrom the actuating arm thereof will be locked in a given position thereby avoiding introduction of sudden transients into the system.

A suitable alternating current embodiment of the actuator 18 may be of the type manufactured and sold by M. P. C. Products Corporation, Chicago, Ill. and identified a part No. J86B. Such actuator is a 400 Hz two phase motor wherein one phase operates at 115 volts and the other phase operates at 0 to 15 volts. In the system of FIG. 1 the latter signals are derived from amplifiers 23 and 27. Maximum electrical power of 50 watts, a stall torque of 135 inch/lbs and a no load speed of 13 rpm characterize one installation.

Limiter 30 and fail detector 31 cooperate to accommodate variations in components of the system while still providing for failure detection. More particularly, the various elements leading to the first input of the actuator 18 may have operating tolerances different from the tolerances in operation of the elements leading to the other input. Because of such differences, an error could appear at the output of summing unit 24 even though the system is in normal operation. The limiter 30 would cause a signal to be applied to amplifier 27 to introduce a command to actuator 18 and force the output of the summing unit 24 to be below a given level. When the difference voltage at the output of summing unit 24 exceeds a certain level, the limiter 30 prevents the output of amplifier 27 from following the output of amplifier 23. If the difference signal appearing at the output of summing unit 24 increases to the level determined by detector 31, then the failure detector 31 responds to open switches 18a and 18b. The level at which failure detector 31 is responsive is somewhat above the level of the limiter 30.

As above noted, in this embodiment the outputs of amplifiers 23 and 27 are alternating current signals generated such that they are 180° out of phase. This inverse phase provides the drive power for actuator 18. In another embodiment, amplifiers 23 and 27 may be DC amplifiers operating with DC sensors to produce output signals of the amplifiers which are DC signals. In still a further embodiment the control signals can be digital.

Figure 2:
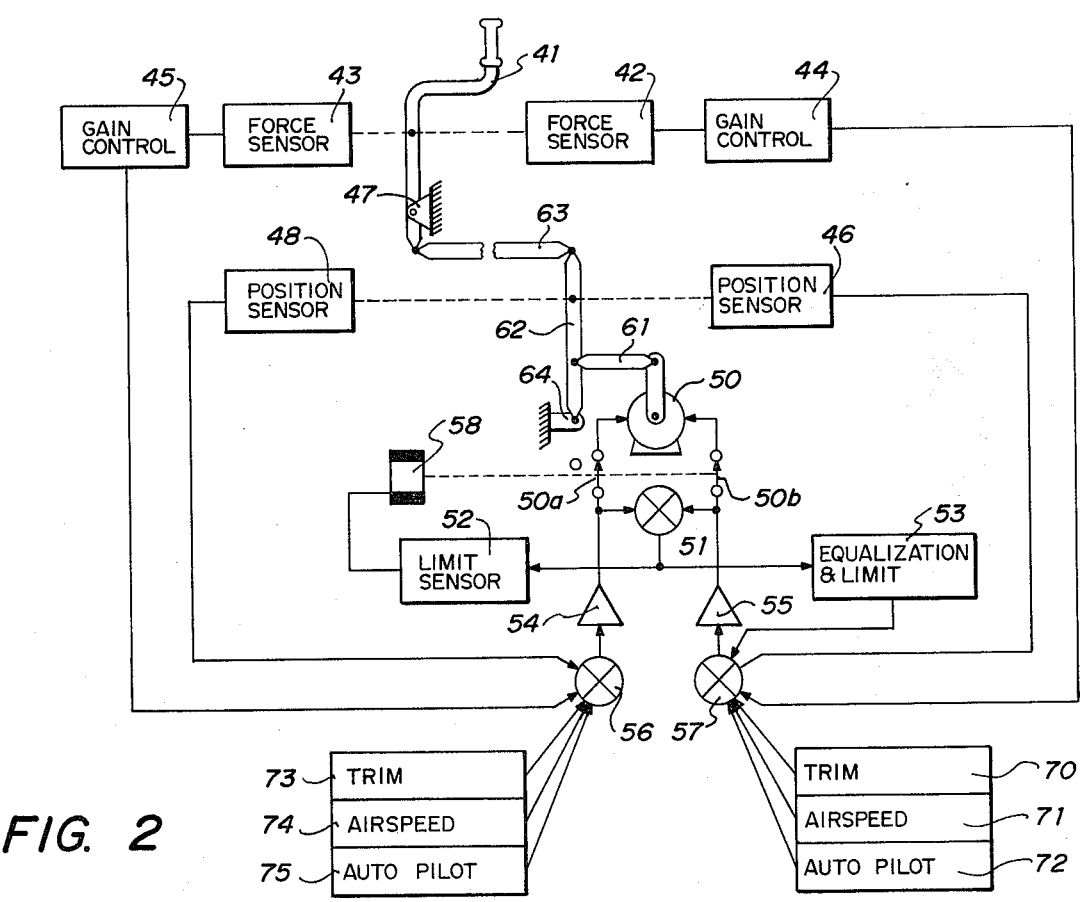
FIG. 2 is a block diagram of a fail safe force feel system in accordance with the present invention, FIGS. 3a and 3b comprise a schematic of a fail safe stability and control augmentation system, and FIGS. 4a and 4b comprise a schematic of a fail safe force feel system.

Referring the FIG. 2 the force feel system of the present invention includes a control stick 41 pivoted at point 47 and connected to linkage 63. Linkage 63 is connected to linkage 62 which is pivoted about point 64 and connected to linkage 61. Linkage 61 is connected to a crank arm of an actuator 50.

A force sensor 42 is mechanically linked to control stick 41 and produces an output applied to a gain control unit 44 which in turn provides an input to summing unit 57. A position sensor 46, mechanically connected to linkage 62, also provides input to summing unit 57. Various other inputs to summing unit 57 can include signals from trim, airspeed and autopilot units 70, 71 and 72, respectively. The output of summing unit 57 is the input to actuator drive amplifier 55, the output of which is connected to actuator 50.

In operation, when a pilot applies a force to control stick 41, the stick force is measured by sensor 42. This signal is conveyed through gain control unit 44 to summing unit 57. In summing unit 57 the signal together with other inputs from units 70–72 generates an error signal which is the input to amplifier 55 which then drives actuator 50. Actuator 50 responds to the output of amplifier 55 to apply a force through linkages 61, 62, and 63. Position sensor 46 detects the movement of linkage 62 and provides an input to summing unit 57. Actuator 50 will continue to move linkages 61 and 62 until the error output signal from summing unit 57 goes to zero. At this point the desired force under the existing conditions has been applied to control stick 41.

A second identical but independent system is provided which provides a second input to actuator 50. More particularly a force sensor 43 measures the force on control stick 41 and is connected to a gain control unit 45 which is connected to a summing unit 56. Position sensor 48, connected to linkage 62, also provides an input to summing unit 56. Other inputs to summing unit 56 can include trim, airspeed and autopilot signals from units 73, 74 and 75, respectively. The error signal output of summing unit 56 goes to an actuator amplifier 54 which drives actuator 50.

The outputs of actuator amplifiers 54 and 55 are also applied as inputs to summing unit 51. The error signal output of summing unit 51 is connected to the inputs to both a limit sensor 52 and an equilization and limit circuit 53. The output of the limit sensor 52 is connected to a power control solenoid 58 which controls the position of disconnect switches 50a and 50b. The output of the equilization and limit circuit 53 is an input to summing unit 57.

In operation, the outputs of drive amplifiers 54 and 55 are compared at the summing unit 51. If there is a difference in output signals in either of the two control loops, an error signal will be generated by the summing unit 51. Limit sensor 52 compares the error signal of summing unit 51 to a predetermined threshold level. If the error signal of summing unit 51 exceeds this threshold, limit sensor 52 operates power control solenoid 58 to open switches 50a and 50b to disconnect the amplifiers 54 and 55 from the actuator 50. The threshold is provided to compensate for component and equipment variations between the two control loops. Within this tolerance range the output of the equilization and limit circuit 53, as input to summing unit 57, balances the outputs of amplifiers 54 and 55. Any error output signal from summing unit 51 which exceeds the threshold of limit sensor 52 is deemed to constitute an equipment failure. When actuator 50 is deenergized the aircraft is placed under the control of the pilot without force feel feedback through control stick 41.

Actuator 50 in FIG. 2 is identical to actuator 18 as described in FIG. 1. As in the embodiment shown in FIG. 1 the control signals in FIG. 2 are alternating current but can also be direct current or digital.

Figure 3A:
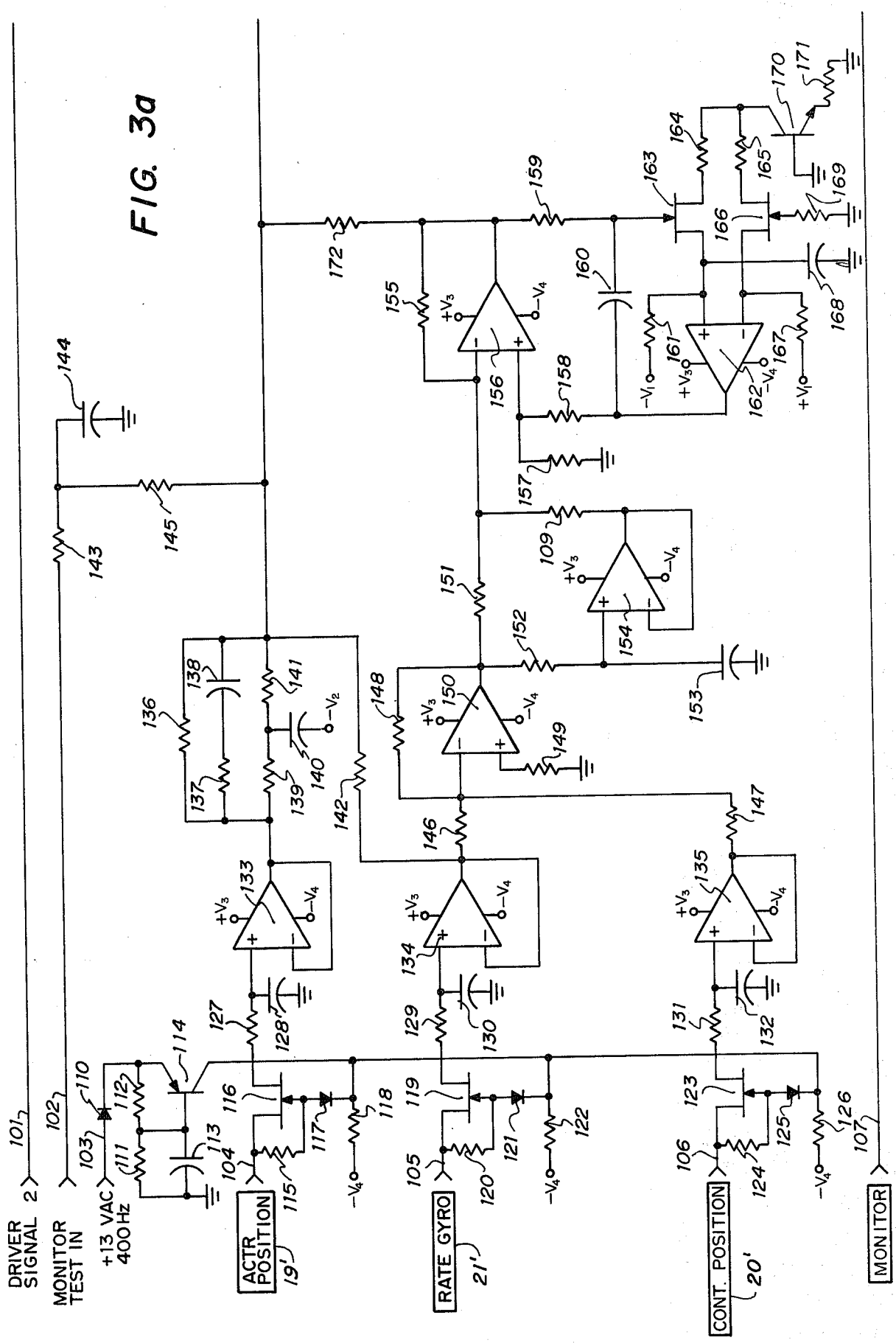
Figure 3B:
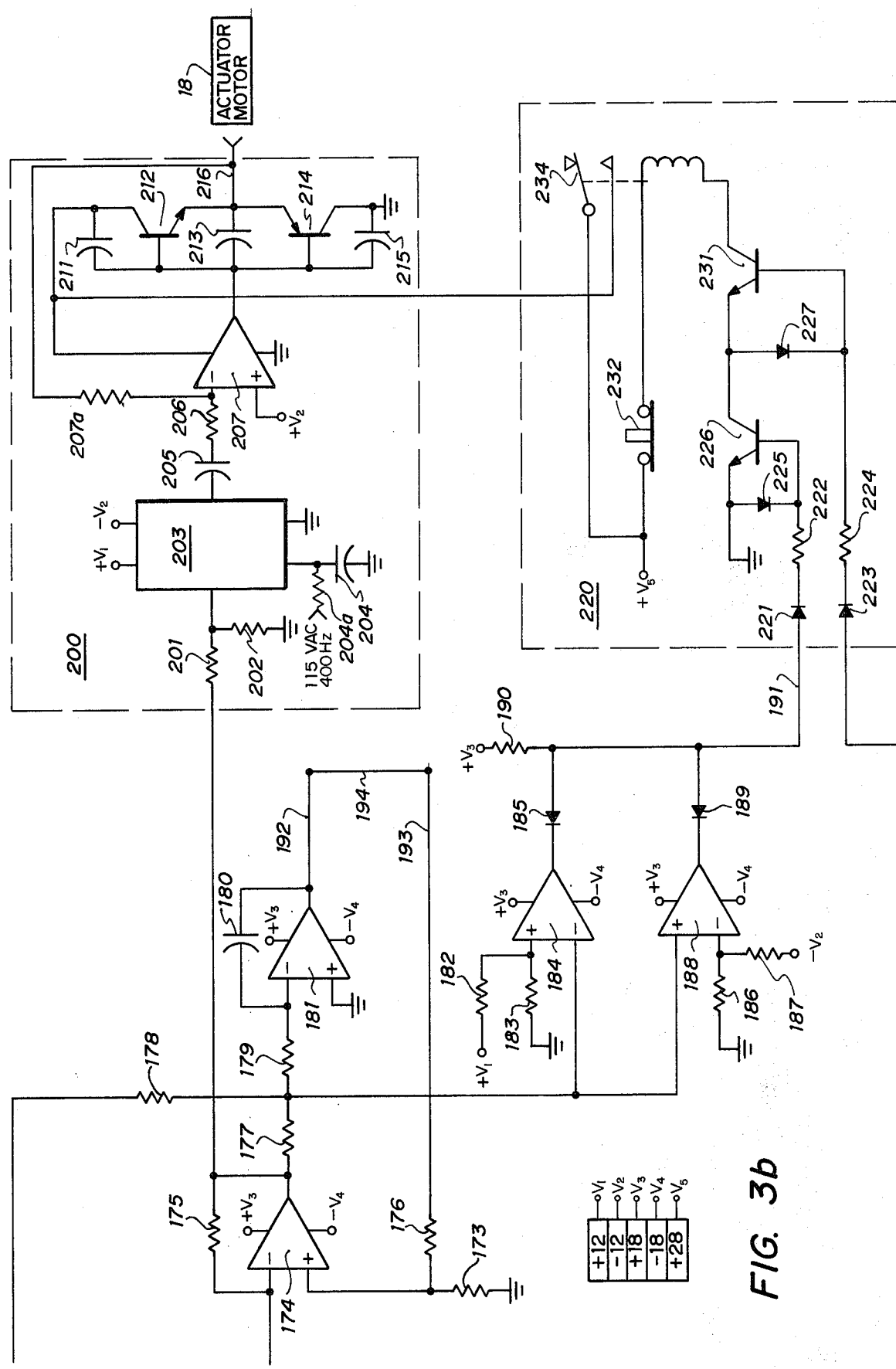

Having described the fail safe aircraft control augmentation system of FIG. 1 and force feel system of FIG. 2 in general terms, they will not be described in more detail. The embodiment shown in FIG. 1 includes two of the circuits of the types shown in FIGS. 3a and 3b. In FIGS. 3a and 3b the actuator position sensor element 19', the control position sensor element 20' and the rate gyro sensor element 21' are illustrated in their circuit relationship to one input of the actuator 18. A like circuit, not shown, would then be provided for the position sensor 28, the control position sensor 25 and the rate gyro 29. Thus, FIGS. 3a and 3b illustrates in detail the circuits connected to the above elements, and of amplifier 23, summing unit 22, summing unit 24, failure detector 31, limiter 30, summing unit 26, amplifier 27 and solenoid 32a of FIG. 1.

Figure 4A:
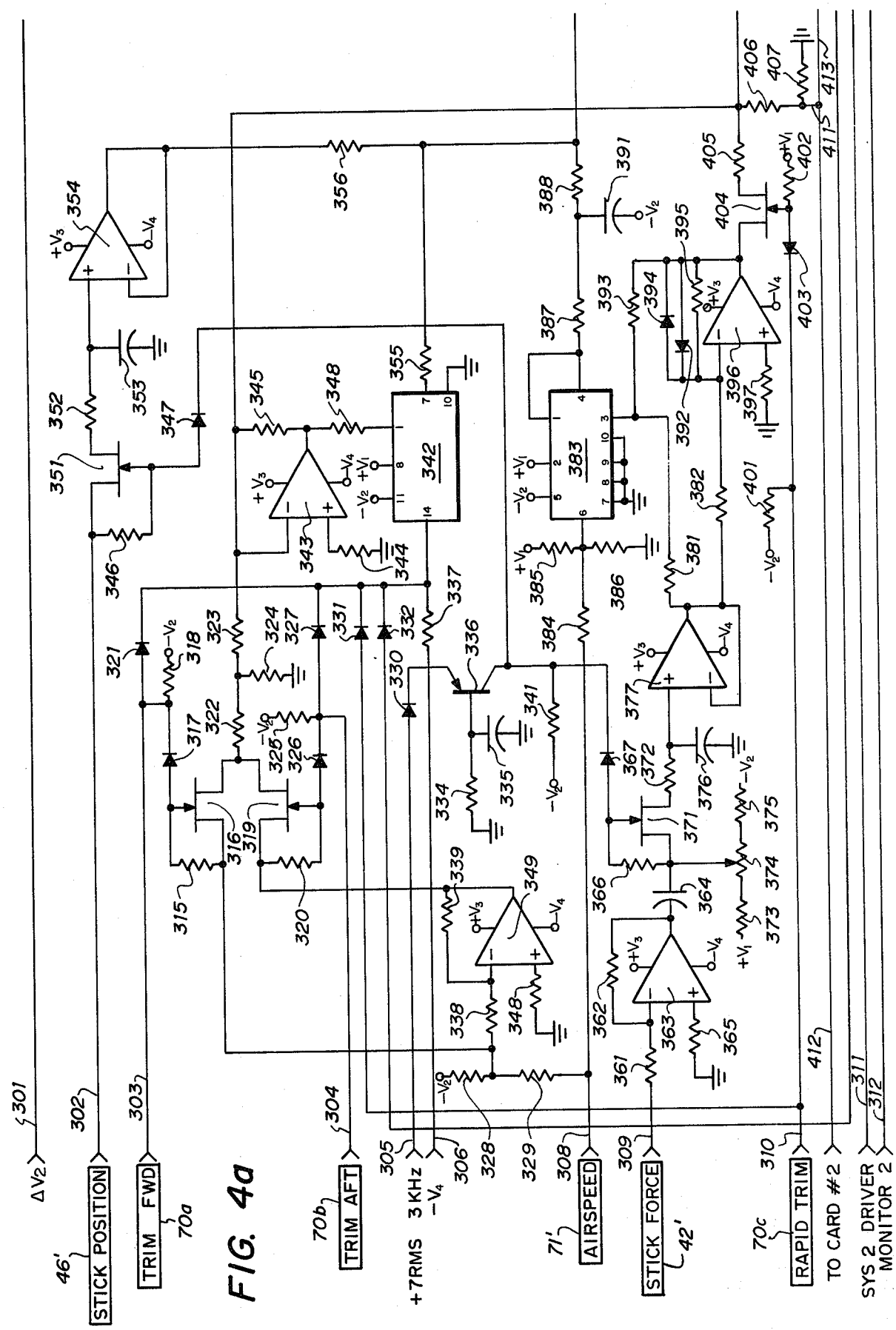
Figure 4B:
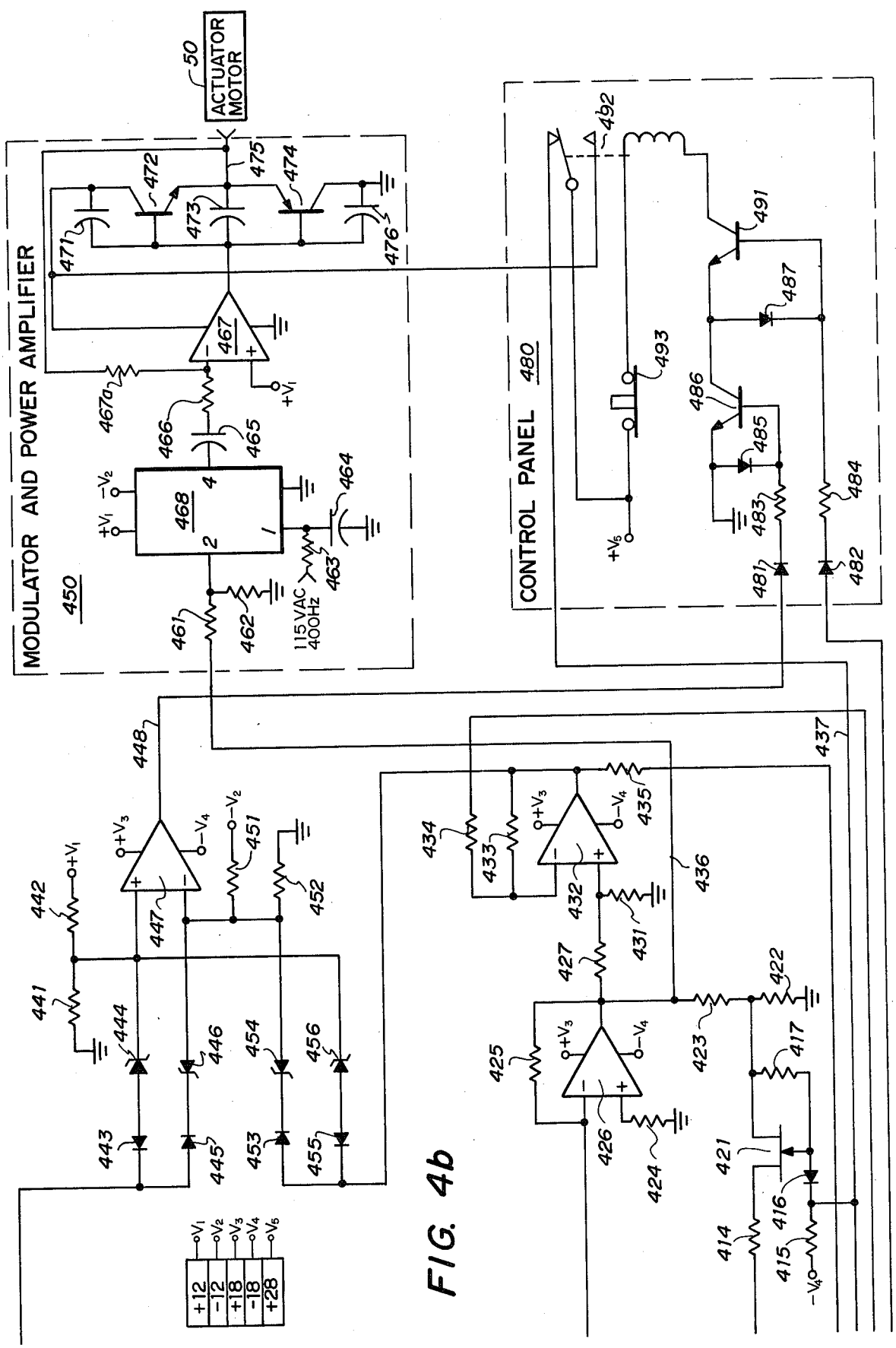

FIG. 2 involves the use of two of the circuits of the type shown in FIGS. 4a and 4b. In FIGS. 4a and 4b, the stick position sensor element 46', trim forward 70a, trim aft 70b, rapid trim 70c, airspeed element 71' and stick force sensor element 42' are illustrated in their circuit relationship to one input of the actuator 50. A like circuit, not shown, would then be provided for the stick position sensor 48, trim sensors 73, airspeed 74, and stick force sensor 43. FIGS. 4a and 4b illustrate in detail summing unit 57, amplifier 55, summing unit 51, limit sensor 52, equilization and limit circuit 53 and solenoid 58 of FIG. 2.

Referring now to FIGS. 3a and 3b, a 400 Hz signal is input on line 103 to the anode of a diode 110. The cathode of the diode 110 is connected through the series combination of the resistors 112 and 111 to ground. The cathode of the diode 110 is also connected to the emitter of a transistor 114. The base of the transistor 114 is connected to the junction of the resistors 111 and 112. A capacitor 113 is connected in parallel with the resistor 111. The collector of the transistor 114 is connected to the cathode of diodes 117, 121 and 125.

The actuator position signal is input on line 104 through a resistor 115 to the anode of a diode 117. Line 104 is also connected to either the source or drain of a symmetrical field effect transistor (FET) 116. The gate of the FET 116 is connected to the anode of the diode 117. The cathode of the diode 117 is connected through the resistor 118 to the negative voltage supply. The remaining terminal of the FET 116 is connected through the series combination of an input resistor 127 and a capacitor 128 to ground. The junction of the resistor 127 and the capacitor 128 is connected to the non-inverting input of an operational amplifier 133. The output of the operational amplifier 133 is fed back to the inverting input and is connected through the series combination of resistors 139 and 141 to the inverting input of an operational amplifier 174 and to a capacitor 140 also tied to the negative voltage supply. Output signals from the operational amplifier 133 are also connected through the series combination of a resistor 137 and a capacitor 138 to the inverting input of the operational amplifier 174. A resistor 136 is in parallel with the series combination of the resistor 137 and the capacitor 138.

A system test signal is input on line 102 and connected through the series combination of resistors 143 and 145 to the inverting input of operational amplifier 174. Connected to the junction of resistors 143 and 145 is a capacitor 144 having a terminal tied to ground.

The output of rate gyro 21' is transmitted on line 105 through a resistor 120 to the anode of a diode 121. This rate gyro output is also connected to either the drain or source of a symmetrical FET 119. The gate of the FET 119 is connected to the anode of the diode 121. The remaining terminal of the FET 119 is connected through a resistor 129 to the non-inverting input terminal of an amplifier 134 and through a capacitor 130 to ground. The cathode of the diode 121 is connected through a resistor 122 to the negative voltage supply.

The output of the operational amplifier 134 is fed back to its inverting input and is connected through a resistor 142 to the inverting input of the operational amplifier 174. The output signal of the operational amplifier 134 is also transmitted through a resistor 146 to the inverting input of an operational amplifier 150.

The output of the control position sensor 20' is input on line 106 through a resistor 124 to the anode of a diode 125. An output of the control position sensor 20' is also connected to either the source or drain terminal of a symmetrical FET 123. The gate of the FET 123 is connected to the anode of the diode 125. From its remaining terminal the output of FET 123 is conveyed through an input resistor 131 to the non-inverting input of an operational amplifier 135. A capacitor 132 is connected between this input and ground. The cathode of the diode 125 is also connected through a resistor 126 to the negative voltage supply.

In feedback fashion, the output of the operational amplifier 135 is connected to its inverting input. The output of the operational amplifier 135 is also connected through a resistor 147 to the inverting input of the operational amplifier 150. As a feedback voltage, the output of the operational amplifier 150 is transmitted through a resistor 148 to the inverting input. A resistor 149 is connected between the non-inverting input of the operational amplifier 150 and ground.

The output of the operational amplifier 150 is also transmitted through a resistor 151 to the inverting input of an operational amplifier 156 and is conveyed through a resistor 152 to the non-inverting input of an operational amplifier 154. A capacitor 153 is connected to the non-inverting input of the operational amplifier 154. As a feedback voltage, the output of the operational amplifier 154 is connected to its inverting input. The output of the operational amplifier 154 is transmitted through a resistor 109 to the inverting input of the operational amplifier 156. A resistor 157 is connected between the non-inverting input of the operational amplifier 156 and ground. For feedback, the output of the operational amplifier 156 is conveyed through a resistor 155 to the inverting input. The output of the operational amplifier 156 is connected through the combination of a resistor 159, a capacitor 160 and a resistor 158 to the non-inverting input. The output of the operational amplifier 156 is connected through a resistor 172 to the inverting input of the operational amplifier 174.

The junction of the resistor 159 and the capacitor 160 is also connected to the gate of an FET 163. The drain of the FET 163 is connected to the non-inverting input of an operational amplifier 162, a capacitor 168, connected to ground, and through a resistor 161 to the negative voltage supply. The source of the FET 163 is connected through a resistor 164 to the collector of a transistor 170 and through a resistor 165 to the source of an FET 166. The base of the transistor 170 is grounded and the emitter is connected through a resistor 171 to ground. The gate of the FET 166 is connected through a resistor 169 to ground and the drain is connected to the inverting input of the operational amplifier 162 and through resistor 167 to the positive voltage supply.

In a feedback loop, the output of the operational amplifier 174 is connected through a resistor 175 to the inverting input. A resistor 173 is connected between the non-inverting input of the operational amplifier 174 and ground. The output of the operational amplifier 174 is transmitted through a series combination of resistors 177 and 179 to the inverting input of an operational amplifier 181. The output of the operational amplifier 174 is the signal applied to the actuator 18 through modulator 203, and the power amplifier 207.

The signal to the actuator 18 from the amplifier 27 is input on line 101 through a resistor 178 to the junction of resistors 177 and 179. The non-inverting input of the operational amplifier 187 is grounded. For feedback, the output of the operational amplifier 187 is conveyed through capacitor 180 to the inverting input. The output of operational amplifier 187 is transmitted through a resistor 176 to the non-inverting input of the operational amplifier 174.

A signal at the junction of resistors 177 and 179 is connected to the inverting input of an operational amplifier 184 and the non-inverting input to an operational amplifier 188. The non-inverting input of the amplifier 184 is connected through a resistor 182 to the positive voltage supply and is connected through a resistor 183 to ground. The inverting input of the operational amplifier 188 is connected through a resistor 187 to the negative voltage supply and is connected through a resistor 186 to ground. The output of the operational amplifier 184 is connected through a diode 185 and a diode 189 to the output of the amplifier 188. The anode of the diode 185 is connected through a resistor 190 to the positive voltage supply. The anode of the diode 185 and 189 are also connected by means of a line 191 to the anode of a diode 221 of a control panel 220.

Returning to the operational amplifier 174, the output is also connected to a voltage divider including the series combination of resistors 201 and 202, the latter tied to ground. The junction of resistors 201 and 202 is connected to the input of a modulator circuit 203, typically, an Analog Devices Model AD532. A 115 volt 400 Hz signal is input to the modulator circuit 203 through a resistor 204a which is also connected to ground through capacitor 204.

The output of modulator circuit 203 is applied through the series combination of a capacitor 205 and resistor 206 to the inverting input of an operational amplifier 207. The non-inverting input to the operational amplifier 207 is connected to the positive voltage supply. The output of the operational amplifier 207 is connected through a capacitor 211 to the collector of a transistor 212, is connected to the base of the transistor 212, is connected through capacitor 213 to the emitters of transistor 212 and transistor 214, is connected to the base of transistor 214 and is connected through capacitor 215 to ground. The collector of transistor 214 is connected to ground. The emitters of transistors 212 and 214 are connected to each other and through line 216 to the motor of actuator 18 and, by way of resistor 207a, to the inverting input of amplifier 207. The collector of the transistor 212 and the power supply to the operational amplifier 207 are interconnected to the lower contact of a relay 234 of the control panel 220.

With reference to the control panel 220, the cathode of the diode 221 is connected through a resistor 222 to the base of a transistor 226. A diode 225 is connected to the base and emitter of the transistor 226. The emitter of the transistor 226 is connected to ground. The collector of the transistor 226 is connected to the anode of the diode 227 and to the emitter of the transistor 231.

The monitor signal from the loop including the control position sensor 25 is input on line 107 to the anode of diode 223. The cathode of diode 223 is connected through resistor 224 to the base of transistor 231 and to a diode 227. The collector of transistor 231 is connected to the coil of relay 234. The remaining terminal of the coil of relay 234 is connected through the noemally closed switch 232 to the positive voltage supply. The movable contact of relay 234 is connected to the positive voltage supply and is in the position shown when the relay is not activated.

Referring now to the detail schematic of the force feel system as shown in FIGS. 4a and 4b, the output of the stick position sensor element 46' is input on line 302 through a resistor 346 to the gate of a symmetrical FET 351. Line 302 is also connected to either the source or drain of the symmetrical FET 351. The remaining terminal of the FET 351 is connected through a resistor 352 to the non-inverting input of operational amplifier 354. Capacitor 353 is connected between the non-inverting input of the operational amplifier 354 and ground. The gate of the FET 351 is also tied to the anode of a diode 347. As a feedback voltage, the output of operational amplifier 354 is transmitted to the inverting input thereof. The output of the operational amplifier 354 is connected through resistor 356 to the inverting input of an operational amplifier 426.

The trim forward indicator 70a output is transmitted on line 303 to the anode of a diode 321 having a cathode connected to the pin 14 of an integrated circuit 342. Line 303 is also connected through a resistor 318 to the negative power supply and to the cathode of a diode 317 having an anode connected through a resistor 315 to either the source or drain of a symmetrical FET 316. The anode of diode 317 is also tied to the gate of the FET 316. The remaining terminal of the FET 316 is connected through the series combination of resistors 322 and 324 to ground.

This remaining terminal of the FET 316 is also connected to either the source or drain of a symmetrical FET 319. The gate of the FET 319 is connected through resistor 320 to the remaining terminal of the FET 319. The gate of FET 319 is also connected to the anode of a diode 326 having a cathode connected through resistor 325 to the negative voltage supply. The cathode of the diode 326 is also connected to the anode of a diode 327 that has a cathode connected to pin 14 of the integrated circuit 342. The junction of resistors 322 and 324 is connected through a resistor 323 to the inverting input of an operational amplifier 343.

In a feedback loop, the output of the operational amplifier 343 is connected through a resistor 345 to the inverting input. A resistor 344 is connected between the non-inverting input to the operational amplifier 343 and ground. The output of the operational amplifier 343 is connected through a resistor 348 to pin 1 of the integrated circuit 342. The output, pin 7, of the integrated circuit 342 is connected through the series combination of resistors 355 and 356 to the output of an operational amplifier 354. The junction of resistors 355 and 356 is connected to the inverting input of an operational amplifier 426.

The output of the rapid trim indicator 70c is input on line 310 to the anode of a diode 331 having a cathode connected to pin 14 of integrated circuit 342. Also tied to the integrated circuit 342 is the cathode of a diode 332 having an anode connected to the upper contact of a relay 492.

A negative DC voltage is input on line 306 through resistor 337 to pin 14 of the integrated circuit 342.

A 7 volt RMS 3 kHz signal is input on line 305 to the anode of a diode 330. The cathode of the diode 330 is connected to the emitter of a transistor 336.

A resistor 334 is connected between the base of the transistor 336 and ground. A capacitor 335 is connected in parallel with the resistor 334. Resistor 341 is connected between the collector of the transistor 336 and the negative voltage supply. The collector of transistor 336 is also connected to the cathode of the diode 347.

The output of the trim aft indicator 70b is input on line 304 to the anode of the diode 327.

The output of the air speed indicator 71' is transmitted on line 308 through a resistor 384 to pin 6 of an integrated circuit 383. Also tied to the pin 6 of the integrated circuit 383 is a bias network consisting of resistors 385 and 386, the former connected to the positive voltage supply and the latter tied to ground. Line 308 is also connected to an input circuit comprising a series combination of resistor 329 and 328, the latter tied to the negative voltage supply. The junction of resistors 328 and 329 is connected through a resistor 338 to the inverting input of the operational amplifier 349. This junction is also connected through a resistor 315 to the gate of the FET 316. The output of the operational amplifier 349 is transmitted through a resistor 339 to the inverting input. A resistor 348 is connected between the non-inverting input of the operational amplifier 349 and ground. The output of the operational amplifier 349 is connected through a resistor 320 to the gate of the FET 319.

The output of the stick force sensor element 42' is input on line 309 through a resistor 361 to the inverting input of an operational amplifier 363. As a feedback voltage, the output of the operational amplifier 363 is connected through resistor 362 to the inverting input. A resistor 365 is tied between the non-inverting input of the operational amplifier 363 and ground.

An output of the operational amplifier 363 is applied through a capacitor 364 to either the source or drain of a symmetrical FET 371 and also through a resistor 366 to the anode of a diode 367 and the gate of the FET 371. The cathode of the diode 367 is connected to the collector of the transistor 336. The junction of the capacitor 364 and the resistor 366 is also connected to the wiper arm of a variable resistor 374. One terminal of the resistive element of the variable resistor 374 is connected through a resistor 373 to the positive voltage supply. The remaining terminal of the resistive element of the variable resistor 374 is connected through a resistor 375 to the negative voltage supply. The remaining terminal of the FET 371 is connected through a resistor 372 to the non-inverting input of an operational amplifier 377. A capacitor 376 is connected between the non-inverting input of the operational amplifier 377 and ground. For feedback, the output of the operational amplifier 377 is connected to the inverting input.

The output of the operational amplifier 377 is connected through a resistor 381 to pin 3 of the integrated circuit 383 and is also connected through a resistor 382 to the inverting input of an operational amplifier 396. The output of the operational amplifier 396 is connected through a resistor 393 to pin 3 of the integrated circuit 383. As a feedback voltage, the output of the operational amplifier 396 is applied through a resistor 395 to its inverting input. Parallel connected diodes 392 and 394 are connected to the inverting input of the operational amplifier 396 in parallel with the resistor 395. A resistor 397 is connected between the non-inverting input of the operational amplifier 396 and ground.

The output of the operational amplifier 396 is connected to either the source or drain of a symmetrical FET 404 having a gate connected through a resistor 402 to the positive voltage supply. The gate of the FET 404 also is connected to the anode of a diode 403. The cathode of diode 403 is connected through a resistor 401 to the negative voltage supply. The output of the rapid trim sensor 70c is input on line 310 to the cathode of the diode 403.

The remaining terminal of the FET 404 is connected through the series combination of resistors 405, 406 and 407 to ground. Line 412 is connected to the junction of resistors 406 and 407 through a jumper 411 to line 413. Line 413 is connected to the output of an operational amplifier 432 through resistor 435.

A delta voltage signal appearing on line 301 is connected to the cathode of a diode 443 and the anode of a diode 445. The anode of the diode 443 is connected to the anode of a Zener diode 444. The cathode of the diode 445 is connected to the cathode of a Zener diode 446. The cathode of the Zener diode 444 is connected to the non-inverting input of an operational amplifier 447. The anode of the Zener diode 446 is connected to the inverting input of the operational amplifier 447. The non-inverting input of operational amplifier 447 is connected through a resistor 442 to the positive voltage supply and this input is connected through a resistor 441 to ground. The inverting input of the operational amplifier 447 is connected through a resistor 451 to the negative voltage supply and through a resistor 452 to ground. The non-inverting input of the operational amplifier 447 is connected to the cathode of a Zener diode 456. The anode of the Zener diode 456 is connected to the anode of a diode 455. The cathode of the diode 455 is connected to the anode of a diode 453. The cathode of the diode 453 is connected to the cathode of a Zener diode 454. The anode of Zener diode 454 is connected to the inverting input of the operational amplifier 447. The anode of diode 453 is connected to the output of the operational amplifier 432.

The output, pin 4, of the integrated circuit 383 is connected through resistors 387 and 388 to the input of an operational amplifier 426. The interconnection of the resistors 387 and 388 is tied through capacitor 391 to the negative voltage supply. The output of an operational amplifier 426 is connected through a resistor 425 to the inverting input. A resistor 424 is connected between the non-inverting input of the operational amplifier 426 and ground.

The output of operational amplifier 426 is applied to a voltage divider consisting of a series combination of resistors 427 and 431 with the junction of resistors 427 and 431 connected to the non-inverting input of the operational amplifier 432. The output of the operational amplifier 432 is fed back through a resistor 433 to the inverting input. The output of the operational amplifier 432 is connected through a resistor 435 to line 413. A driver signal on line 311 is connected through a resistor 434 to the inverting input of the operational amplifier 432.

Returning to the operational amplifier 396, the junction of the resistors 405 and 406 is connected through a resistor 414 to either the source or drain terminal of a symmetrical FET 421. The gate of the FET 421 is connected to the anode of a diode 416. The remaining terminal of the FET 421 is connected through resistor 417 to the anode of the diode 416, through a resistor 422 to ground and through a resistor 423 to the output of the operational amplifier 426. The cathode of diode 416 is connected through a resistor 415 to the negative voltage supply and through line 437 to the upper contact of a relay 492. The output of the operational amplifier 426 is transmitted on a line 436 to a resistor 461.

The output of the operational amplifier 447 is transmitted on line 448 to the anode of a diode 481 of a control panel 480. The cathode of the diode 481 is connected through resistor 483 to both the cathode of a diode 485 and the base of a transistor 486. The emitter of transistor 486 is connected to the anode of the diode 485 and to ground.

The monitor signal on line 312 is connected to the anode of a diode 482. The cathode of the diode 482 is connected through a resistor 484 to both the cathode of a diode 487 and the base of a transistor 491. The emitter of the transistor 491 is connected to the anode of the diode 487 and to the collector of the transistor 486. The collector of the transistor 491 is also connected to one terminal of the coil of the relay 492. The other terminal of the coil of relay 492 is connected through the normally closed switch 493 to the positive voltage supply. The pole of relay 492 is connected to the positive voltage supply. The lower contact of relay 492 is connected to the collector of the transistor 472 and the power supply terminal for an operational amplifier 467.

With reference to the modulator and power amplifier 450, line 436 is connected to a resistor 461 having a second terminal connected to pin 6 of an integrated circuit 468, which is an Analog Devices Model AD532 and a resistor 462 to ground. A 115 volt 400 Hz signal is input through resistor 463 to pin 1 of the integrated circuit 468. Capacitor 464 is connected between pin 1 of the integrated circuit 468 and ground. The output, pin 4, of the integrated circuit 468 is connected through the series combination of a capacitor 465 and a resistor 466 to the inverting input of the operational amplifier 467. The non-inverting input of operational amplifier 467 is connected to a positive voltage supply. The output of the operational amplifier 467 is connected through a capacitor 471 to the collector of the transistor 472, is connected to the base of the transistor 472, is connected through capacitor 473 to the emitters of the transistors 472 and 474, is connected to the base of transistor 474 and is connected through capacitor 476 to the collector of the transistor 474 which is connected to ground. The emitters of transistors 472 and 474 are connected to each other and through line 475 to the actuator motor 50 and also to the inverting input of amplifier 467 through resistor 467a.

The operation of the fail safe electronic stability control and augmentation system of FIGS. 3a and 3b will now be described. A 400 Hz signal is input on line 103 to transistor 114 which creates a series of sampling pulses at a rate of 400 Hz. These pulses turn on FET's 116, 119 and 123. The signal from the actuator position sensor element 19' is input on line 104 to FET 116. The rate gyro element 21' signal is input on line 105 to FET 119. The control stick sensor element 20' signal is input on line 106 to FET 123. Each of these three inputs is an amplitude modulated 400 Hz signal. The three FET's sample the input waveforms at either the positive or negative going peaks. The input waveforms are in phase. The peak waveform voltages are stored respectively in capacitors 128, 130 and 132. These voltages are input to unitary gain operational amplifiers 133, 134 and 135, respectively.

The rate gyro and control motion signals are summed in operational amplifier 150 and processed through amplifiers 154, 156 and 162 to provide control for the FET's 163 and 166. This processing circuitry is designed to accommodate the particular characteristics of the aircraft in which the system is utilized. The processed output from the amplifier 156, together with the actuator feedback signal, is summed in operational amplifier 174.

To compensate within the system for component variations, an equalization network is provided which operates through operational amplifier 187. The difference of the two loop signals is detected by operational amplifier 187 and fed back to the summing operational amplifier 174. Operational amplifier 187 provides equalization below a predetermined threshold.

The DC level driver signal from the amplifier 174 is input to integrated circuit 203. Also input is a 115 volt AC 400 Hz signal. The driver signal modulates the AC signal. This modulated AC signal is then amplified by operational amplifier 207 in the amplifier combination consisting of transistors 212 and 214. The emitter output of these transistors drives the actuator motor 18.

There are two control loops, as shown in FIG. 1, with only one loop shown schematically in FIGS. 3a and 3b. The driver output from one loop is summed with the driver output of the second loop at the inputs to operational amplifiers 184 and 188. The system is designed such that these outputs are the inverse of each other and under normal operations with no failure the sum of the two signals is zero.

The circuitry consisting of operational amplifiers 184 and 188 together with the associated components perform a threshold detecting function which provides an output when the sum of the two driver signals exceeds the threshold. In the present embodiment, a negative output is provided when the sum of the two signals exceeds a positive three volts or is less than a negative 3 volts.

The output of operational amplifiers 184 and 188 are designated as the monitor 1 signal and is transmitted on line 191. The voltage level on this line is normally high due to resistor 190 and the positive voltage supply. When the sum of the two driver signals exceeds the threshold value, either operational amplifier 184 or 188 is activated and line 191 goes to a negative level. The usual high level on line 191 forward biases transistor 226 in control panel 220. When these transistors are turned on the pole of relay 234 is activated and is set to the lower position. In this position the positive voltage supply is connected to the collector of transistor 212 and the power supply for operational amplifier 207. Only under this condition can the actuator motor be driven. When a failure condition is detected the voltage on line 191 goes negative.

Monitor signal 2 is derived from the second loop of FIG. 1 and functions in a manner similar to that of the first loop. When either of the two input signals, on lines 191 or 107, goes negative the forward bias to either transistor 226 or 231 is removed. Since these two transistors are in series, if either goes off the current actuating relay 234 is removed. When this current is removed the pole of relay 234 returns to its rest position, against the upper contact. This removes the power supply voltage from the amplifiers which drives the actuator motor 18. Thus, if a failure is detected in either loop one or loop two the power to the actuator motor is removed and the aircraft is returned to the manual control of the pilot.

The operation of the fail safe electric force feel-/autopilot system of FIG. 2 is described by reference to FIGS. 4a and 4b. The three trim inputs to the system, forward 70a on line 303, aft 70b on line 304 and rapid 70c on line 310 are on/off DC levels. The "on" level is 28 volts and the "off" level is zero. The stick position input element 46' is an amplitude modulated 400 Hz signal. The air speed is a zero to 8 volt 8 volt DC level.

The stick force element 42' input is a 3 kHz amplitude modulated signal. Whenever any of the three trim inputs are present the integrator 342 is started.

There are two force feel loops for each axis as shown in FIG. 2. The outputs of these two loops are the inverse of each other as in the fail safe stability control and augmentation system. The output of the integrator or pin 7 is one of three functions which determines the force to be applied to the control stick.

Transistor 336 is turned on at a rate of 3 kHz by the input signal on line 305. The output of transistor 336 provides a signal to turn on FET 371 to sample the 3 Khz input signal from the stick force indicator element 42'. FET 371, by sampling the input signal, demodulates it and converts it to a DC level which is stored in capacitor 376. This level is transferred through operational amplifier 377 to the integrated circuit 383. Operational amplifier 396 and the associated resistors and diodes provide a threshold function. This circuitry prevents signals below the threshold level from reaching the integrated circuit 383.

The output of the integrated circuit 383 on pin 4 is the quotient of the signal on pin 3 divided by the input air speed signal on pin 6. The outputs of the integrated circuits 342 and 383 and amplifier 354 are summed in operational amplifier 426. The output of operational amplifier 426 is the driver signal on line 436 for the modulator 468.

The loop two driver signal is input on line 311 and is compared with the loop one driver signal in operational amplifier 432. The differential voltage is the output of operational amplifier 432. In the loop of FIGS. 4a and 4b, a jumper 411 connects lines 412 and 413 to implement the equalization function. Differences in the driver signals less than that of a predetermined level are fed back to the system and compensated to maintain the levels of loops one and two of equal magnitude but of opposite polarity. The two driver signals are likewise compared in loop two and this difference is input on line 301 to loop one. The two difference signals are then threshold detected in operational amplifier 447 with the diode threshold detecting circuitry. When either of the difference signals from the two loops exceeds a predetermined threshold there is an output from operational amplifier 447.

The driver signal on line 436 modulates a 115 volt 400 Hz signal in integrated circuit modulator 468. This signal is amplified in operational amplifier 467 and the amplifier consisting of transistors 472 and 474. The output of these transistors provides the driving voltage for the actuator motor 50.

The monitor signal from loop one, which is the output of operational amplifier 447 is input to the control panel 480. The monitor signal from loop two is also input to control panel 480. There is one control panel for the system of FIG. 2. The monitor 1 and 2 input levels to the control panel are normally high thus forward biasing transistors 486 and 491. In this forward biased condition there is current flowing through the coil of relay 492. In the non-energized state the pole of relay 492 contacts the upper contact. But in the energized state the pole contacts the lower contact which is connected to the power terminal of operational amplifier 467 and the power transistors 472 and 474. Thus, when the transistors 486 and 491 are activated there is power supplied to the driving amplifier for the actuator motor 50; but when either loop one or loop two detects that the difference in the driver signals exceeds the predetermined threshold, the voltage on the monitor line will go low. When either of the monitor lines goes low, either transistor 486 or 491 is turned off. This removes the current from the coil of relay 492 and the pole returns to the upper contact. This in turn removes the voltage supply from the power amplifier which drives the actuator motor 50. Thus, when a failure is detected the force feel system is deactivated and the aircraft is returned to the manual control of the pilot.

While a particular embodiment of the invention has been shown and described, it will be understood that various other modifications are possible without departing from the principles of the invention. The appended claims are, therefore, intended to cover any such modifications.

What is claimed is:

1. An aircraft control system, comprising:
    input means for introducing a manual commnd to position a control surface,
    stability control augmentation means comprising:
    (a) an actuator connected through linkage to the control surface,
    (b) at least two drive circuits for said acutator, each comprising:
        (i) a position sensor responsive to said input means and generating a position signal, and
        (ii) a drive amplifier responsive to the position signal and providing an output to drive said actuator,
    (c) means responsive to the outputs of the drive amplifiers to produce a difference signal, and
    (d) means responsive to the difference signal to disable said actuator.

2. An aircraft control system as recited in claim 1 which includes means for detecting when said difference signal exceeds a predetermined threshold.

3. An aircraft control system as recited in claim 2, which includes means for disabling said actuator when said difference signal exceeds said predetermined threshold.

4. An aircraft control system as recited in claim 1 wherein each of said drive circuits includes:
    (a) an actuator position sensor, and
    (b) a summing unit for summing the outputs of said position sensor and said actuator position sensor.

5. An aircraft control system as recited in claim 4 which includes means for adding said difference signal to one of said summing units.

6. An aircraft control system as recited in claim 1 which includes means for locking the position of said actuator after said actuator has been disabled.

7. An aircraft control system, comprising:
    input means for introducing a manual command to position a control surface,
    force feel means comprising:
    (a) an actuator connected through linkage to said input means,
    (b) at least two drive circuits for said actuator each comprising:
        (i) a force sensor responsive to said input means and generating a force signal, and
        (ii) a drive amplifier responsive to the force signal and providing an output to drive said actuator,
    (c) means responsive to the outputs of the drive amplifiers to produce a difference signal, and
    (d) means responsive to the difference signal to disable said actuator.

8. An aircraft control system as recited in claim 7 which includes means for detecting when said difference signal exceeds a predetermined threshold.

9. An aircraft control system as recited in claim 8 which includes means for disabling said actuator when said difference signal exceeds said predetermined threshold.

10. An aircraft control system as recited in claim 7 wherein each of said drive circuits includes:
 (a) an actuator position sensor, and
 (b) a summing unit for summing the outputs of said force sensor and said actuator position sensor.

11. An aircraft control system as recited in claim 10 which includes means for adding said difference signal to one of said summing units.

* * * * *

UNITED STATES PATENT AND TRADEMARK OFFICE
CERTIFICATE OF CORRECTION

PATENT NO. : 4,095,763
DATED : June 20, 1978
INVENTOR(S) : Kenneth E. Builta

It is certified that error appears in the above-identified patent and that said Letters Patent are hereby corrected as shown below:

Column 3, line 46 - "Referring the" should be
--Referring to--.

Column 7, line 18 - "diode" should be --diodes--.

Column 7, line 62 - "noemally" should be --normally--.

Column 9, line 8 - "resistor" should be --resistors--.

Column 12, line 68 - "8 volt 8 volt" should be --8 volt--.

Column 13, line 36 - "to" should be --into--.

Column 14, line 18 - "commnd" should be --command--.

Signed and Sealed this

Third Day of April 1979

[SEAL]

Attest:

RUTH C. MASON
Attesting Officer

DONALD W. BANNER
Commissioner of Patents and Trademarks